3,121,105
ORGANOPHOSPHORUS DERIVATIVES OF LACTONES
Richard L. McConnell and Harry W. Coover, Jr., Kingsport, Tenn., assignors to Eastman Kodak Company, Rochester, N.Y., a corporation of New Jersey
No Drawing. Filed Oct. 29, 1959, Ser. No. 849,463
5 Claims. (Cl. 260—461)

This invention relates to new organophosphorus compounds and to a method for the preparation of said compounds. In a specific aspect this invention relates to the preparation of new organophosphorus compounds by the reaction of alkyl phosphorodiamidites or dialkyl phosphoramidites with lactones.

Organophosphorus compounds have shown marked utility and importance in many fields. For example, many organophosphorus compounds have been employed as insecticides and pesticides as well as plasticizers for many resinous compounds. Consequently, it is of considerable importance to discover new and useful organophosphorus compounds and to have a process for the production of said compounds. It is an object of this invention to provide new and useful organophosphorus compounds. It is another object of this invention to provide a novel method for preparing the new and useful organophosphorus compounds. It is still another object of this invention to provide new and valuable flame-proofing plasticizers for resinous materials such as cellulose esters. Other objects of this invention will be apparent from the detailed disclosure of our invention appearing hereinafter.

In accordance with this invention, it has been found that new organophosphorus compounds can be prepared by reacting a phosphorodiamidite or a phosphoramidite with a lactone. The new organophosphorus compounds of this invention have the structural formula:

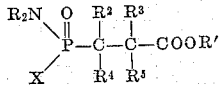

wherein X is selected from the group consisting of alkoxy radicals containing 1 to 8 carbon atoms and dialkylamino radicals wherein each alkyl radical contains 1 to 8 carbon atoms, R represents a member selected from the group consisting of hydrogen and lower alkyl radicals, R' represents and alkyl group containing 1 to 8 carbon atoms and $R^2$, $R^3$, $R^4$ and $R^5$ each represents a radical selected from the group consisting of (a) a monovalent radical selected from the group consisting of hydrogen and lower alkyl and (b), when $R^3$ and $R^5$ are hydrogen, a divalent radical wherein $R^2$ and $R^4$ together represent a lower alkylidene radical.

The compounds of this invention are prepared by reacting a phosphorodiamidite or a phosphoramidite having the structural formula:

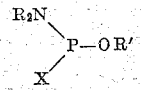

with a β-lactone having the structural formula:

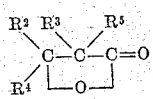

wherein X, R, R', $R^2$, $R^3$, $R^4$ and $R^5$ are defined above
The following equations are typical of the reactions that occur in the preparation of illustrative compounds of this invention.

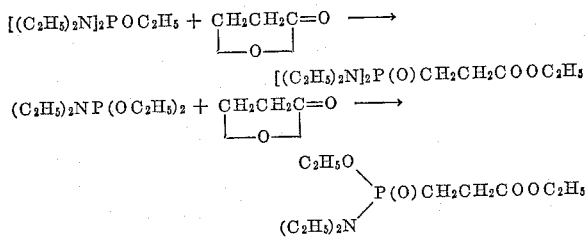

In the practice of our reaction it is desirable to add one of the reactants to a reactor containing the other reactant. For example, the amidite can be added gradually to the lactone, but if desired, the reverse procedure of addition can be used, and the lactone can be added gradually to the amidite. The operable temperature range for the reaction is generally from −25 to 250° C. with a preferred temperature range being from 25 to 200° C. It will be realized that the preferred temperature range is quite variable and dependent to some extent upon the reactants that are employed. The reaction period varies from 1 to 24 hours but longer and shorter reaction times can sometimes be employed effectively. The products of our invention can be prepared by using any molar ratio of reactants, but we have found it preferable to employ an excess of the amidite or diamidite when monomeric reaction products are desired. When equimolar amounts of reactants or an excess of the lactone is employed substantial amounts of telomers are produced. These polymeric materials can have the following structures:

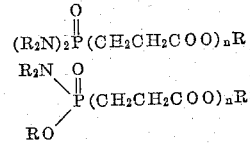

wherein $n$ represents a whole number. Ordinarily, it is not essential that a solvent be employed in our process, but we have found that in some instances the presence of an inert solvent tends to limit the telomerization reaction and to direct the reaction toward the production of the monomeric reaction products. Among the solvents that can be used are normally liquid, aliphatic and aromatic hydrocarbons, such as pentane, heptane, octane, benzene, toluene, the xylenes and the like as well as chlorinated derivatives of the above-named hydrocarbons.

The following examples are illustrative of our invention.

EXAMPLE 1

*N,N-Dimethyl-O-Ethyl 2-Ethoxycarbonylethylphosphonamidate*

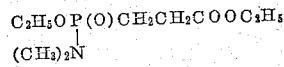

Diethyl dimethylphosphoramidite (0.2 mole) and β-propiolactone (0.1 mole) were mixed with stirring. After a short induction period, the temperature of the reaction mixture gradually rose to a maximum of 108° C. When the reaction mixture had cooled back to 25° C., it was heated with stirring to 180° over a 2-hour period. The crude product is a dark viscous oil. This product was purified by distillation in vacuo. It was collected at 110–116° C. at 0.7–0.8 mm., $n_D^{20}$, 1.4404. This distilled material was a light yellow liquid.

Similar results were obtained when diethyl dibutylphosphoramidite, diethyl bis(2-ethylhexyl)phosphoramidite, diisobutyl dimethylphosphoramidite, bis(2-ethylhexyl) diethylphosphoramidite, dimethyl diethylphosphoramidite, diethyl diethylphosphoramidite, and dimethyl dimethylphosphoramidite were treated with β-propiolactone, 3-hydroxy-2,2,4-trimethylpentanoic acid β-lactone, β-angelica lactone, β-butyrolactone, or pivalolactone.

EXAMPLE 2

*N,N,N',N'-Tetramethyl 2-Ethoxycarbonylphosphonic Diamide*

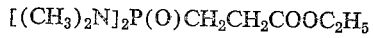

Ethyl tetramethylphosphorodiamidite (0.2 mole) and β-propiolactone (0.1 mole) were reacted according to the procedure described in Example 1. The product was a light yellow liquid and it distilled at 116–120° C. at 0.9 mm.

Similar results were obtained when β-propiolactone was treated with methyl-, butyl-, isobutyl-, and 2-ethylhexyl tetramethylphosphorodiamidite, methyl-, ethyl-, propyl-, butyl-, and 2 - ethylhexyl tetraethylphosphorodiamidite, methyl-, ethyl-, butyl-, and 2-ethylhexyl tetrabutylphosphorodiamidite, and methyl-, ethyl-, isobutyl-, and tetrakis(2-ethylhexyl)phosphorodiamidite.

EXAMPLE 3

*N,N-Diethyl-O-Butyl 2-Butoxycarbonylethylphosphonamidate*

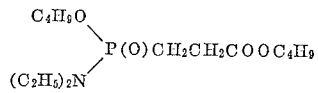

Dibutyl diethylphosphoramidite (0.2 mole) and β-propiolactone (0.1 mole) were placed in 200 ml. of xylene and refluxed for 8 hours. Distillation of the reaction mixture gave a 65% yield of a yellow oily product.

Similar results were obtained using bromobenzene, chlorobenzene, toluene, or anisole as the solvent.

EXAMPLE 4

*N,N-Diethyl-O-Ethyl 3-Ethoxycarbonylpropylphosphonamidate*

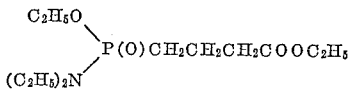

Diethyl diethylphosphoramidite (0.8 mole) and γ-butyrolactone (0.2 mole) were reacted in an autoclave at 225° C. for 8 hours. Distillation of the dark oily reaction mixture gave a 25% yield of the product, B.P. 135–138° C. at 1.5 mm.

Similar results were obtained when the other phosphoramidites set forth in Example 1 were reacted with γ-butyrolactone and 6-hydroxy-2-norcamphanecarboxylic acid lactone.

EXAMPLE 5

*O-Ethyl 2-Ethoxycarbonylethylphosphonamidate*

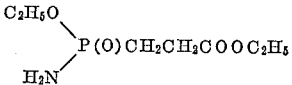

This compound was prepared by treating β-propiolactone (0.1 mole) with diethyl phosphoramidite (0.4 mole) according to the procedure of Example 1.

EXAMPLE 6

*Telomer From β-Propiolactone and Dimethyl Dimethylphosphoramidite*

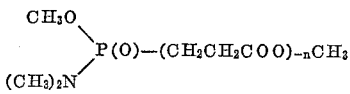

Dimethyl dimethylphosphoramidite (0.1 mole) and β-propiolactone (0.4 mole) were mixed in 100 ml. of toluene and heated to reflux for 4 hours. Evaporation of the solvent and unreacted phosphoramidite left the product as a white powder whose average molecular weight was 850.

Similar results were obtained using the phosphoramidites and phosphorodiamidites set forth in Examples 1 and 2.

EXAMPLE 7

*Use of Compounds as Flameproofing Plasticizers*

Two grams of cellulose acetate powder and 18 ml. of acetone were placed in a screw cap vial and agitated until a smooth, transparent dope was obtained. Then 0.5 of N,N-dimethyl-O-ethyl 2-ethoxycarbonylethylphosphonamidate was added and agitated until it had dissolved. This dope was poured on a glass plate and a thin film prepared with a doctor blade. When the acetone had evaporated, the transparent, well plasticized film was removed from the plate and heated in an oven at 85° C., for 30 minutes to remove residual solvent. The flame resistance of this film was measured by clamping a strip of film (0.5" x 6") horizontally in a draft free burning shield. A piece of wire gauze was clamped just below the strip of film. After igniting the end of the film with a burning splint, the number of relights or the time required to consume the film is noted. Six to eight relights were required to consume samples of the above-described film completely. Cellulose acetate film plasticized with a conventional plasticizer such as diethyl phthalate was completely consumed with only one ignition in 25 seconds. The other organophosphorus compounds described in these examples gave similar flameproofing action.

Although the invention has been described in considerable detail with reference to certain preferred embodiments thereof, variations and modifications can be effected within the spirit and scope of this invention as described hereinabove and as defined in the appended claims.

We claim:

1. The organophosphorus compounds having the structural formula:

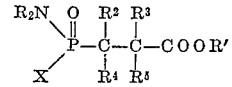

wherein X is selected from the group consisting of alkoxy radicals containing 1 to 8 carbon atoms and dialkylamino radicals wherein each alkyl radical contains 1 to 8 carbon atoms, R represents a member selected from the group consisting of hydrogen and lower alkyl radicals, R' represents an alkyl group containing 1 to 8 carbon atoms and $R_2$, $R_3$, $R_4$ and $R_5$ each represents a radical selected from the group consisting of a monovalent radical selected from the group consisting of hydrogen and lower alkyl.

2. N,N-dimethyl-O-ethyl 2 - ethoxycarbonylethylphosphonamidate.

3. N,N,N',N'-tetramethyl 2-ethoxycarbonylphosphonic diamide.

4. N,N - diethyl-O-butyl 2-butoxycarbonylethylphosphonamidate.

5. N,N - diethyl-O-ethyl 3-ethoxycarbonylpropylphosphonamidate.

References Cited in the file of this patent

UNITED STATES PATENTS

| | | |
|---|---|---|
| 2,652,416 | Coover et al. | Sept. 15, 1953 |
| 2,668,119 | Horback et al. | Feb. 2, 1954 |
| 2,710,301 | Morris et al. | June 7, 1955 |
| 2,831,014 | Sallmann et al. | Apr. 15, 1958 |
| 2,836,504 | Dock Fon Toy et al. | May 27, 1958 |
| 2,841,604 | Dock Fon Toy et al. | July 1, 1958 |
| 2,856,390 | Coover et al. | Oct. 14, 1958 |
| 2,875,231 | McConnell et al. | Feb. 24, 1959 |